Nov. 8, 1966 C. GOODACRE 3,284,153
VEHICLE BATTERY MOUNTING
Filed Aug. 4, 1964
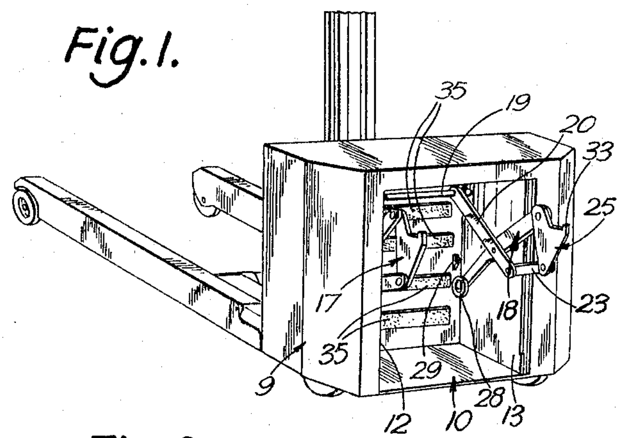
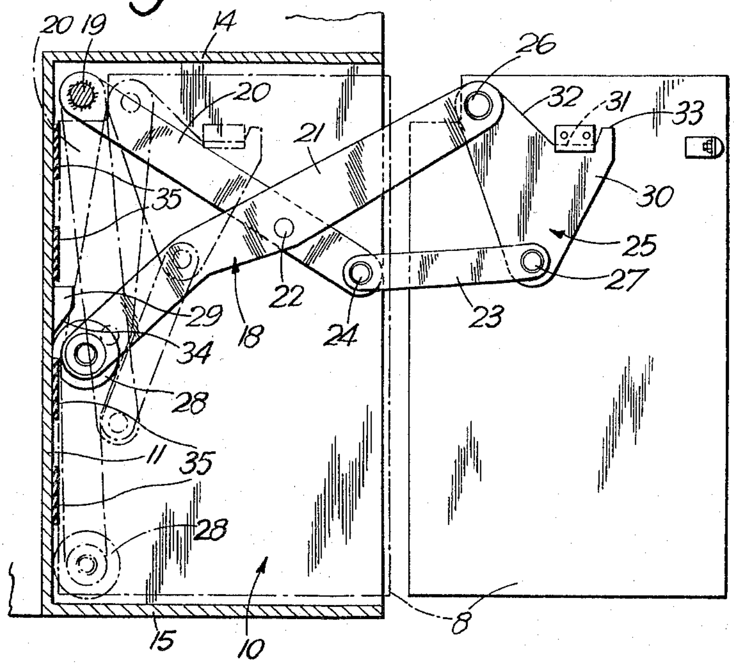

United States Patent Office 3,284,153

Patented Nov. 8, 1966

3,284,153

VEHICLE BATTERY MOUNTING

Cecil Goodacre, Basingstoke, England, assignor to Lansing Bagnall Limited, Basingstoke, England, a British company Filed Aug. 4, 1964, Ser. No. 387,380

Claims priority, application Great Britain, Aug. 6, 1963, 30,993/63

4 Claims. (Cl. 312—331)

This invention comprises improvements in or relating to electrically-driven vehicles.

According to the invention, there is provided an electrically-driven vehicle of the type having a compartment for an electric storage battery, wherein an expanding linkage is mounted in the compartment, the linkage being adapted to carry the battery and being so positioned and proportioned that when a battery is mounted on it and it is expanded, it guides the battery in a substantially horizontal direction between a contracted position in which the battery is inside or mainly inside the compartment and an expanded position in which the battery is clear of the compartment.

Preferably, the expanding linkage is housed wholly within the compartment when supporting the battery in its contracted position.

Conveniently, the expanding linkage may be so constructed that, when in its expanded position, it is locked in that position and when in a position between its expanded and its contracted positions, it tends to move under the effect of its weight and that of the battery to its contracted position.

The expanding linkage may comprise a first link, which is pivoted to a fixed member in the upper part of the compartment and extends downwardly therefrom, a second link, which is pivoted at a point between its ends to the first link and has its lower end guided for up-and-down movement, a third link pivoted to the first link at a point below the pivot between the first and second links and a fourth link which is pivoted to the second link at a point above the pivot between the first and second links and is also pivoted to the third link, said fourth link being adapted to carry the battery and the arrangement being such that said fourth link moves in a substantially horizontal direction during expansion and contraction of the linkage. The lower end of the second link may, for example, be provided with a roller which in the expanded position of the linkage abuts against an upper stop on a fixed upright member. Conveniently, the third link is substantially horizontal in the expanded position of the linkage thereby serving to lock the linkage when in its expanded position against undesired movement towards its contracted position.

There may be two identical expanding linkages, one at each side of the compartment, which linkages are connected to move together and are adapted to carry the battery between them.

By way of example, one construction of an electrically-driven vehicle in accordance with the invention will now be described with reference to the accompanying drawings in which:

FIGURE 1 is a perspective view of the vehicle showing an open compartment for the battery in which there is a pair of expanding linkages, the linkages being shown carrying the battery and in their expanded position;

FIGURE 2 is a sectional elevation of the compartment of the vehicle shown in FIGURE 1 showing one of the linkages in both its expanded and contracted positions and also the battery carried thereby.

The vehicle is of the type which has a compartment for an electric storage battery 8 for supplying current to the electric motor which drives the vehicle 9. The compartment 10 may be at any convenient place on the vehicle and is in the form of a box having a back 11, two sides 12, 13, a top 14 and a floor 15. The front of the box is open to permit access to the interior of the box thereby to enable the battery to be moved into and out of the box.

Mounted in the box are a pair of identical expanding linkages 17, 18 which support the battery and guide it to move in a substantially horizontal direction between a contracted position (shown in broken lines in FIGURE 2) in the compartment and an expanded position (shown in full lines in FIGURE 2) in which it is clear of the box. The linkage 17 is adjacent to the left-hand side 12 of the box as viewed through the front and the other linkage 18 is adjacent to the right-hand side 13 of the box and the battery is carried between the linkages. The linkages 17, 18 are connected together by means of a rotatable rod 19 which extends between the side walls 12, 13 and which is rotatable with end bearings attached to, or mounted in, the side walls. When the battery is inside the compartment, one side of the battery casing constitutes the front 16 of the box.

Each linkage 17, 18 comprises four links. There is a first link 20 which is mounted at one end to the rod 19, which is located at a point adjacent to the top 14 of the box and to the back 11 of the box, a second link 21 pivoted at 22 at approximately its mid-point to the first link 20 the length of the second link 21 being only slightly less than the height of the box, a third link 23 pivoted to the first link at 24 at a point below the pivot 22 between the first and second links and a fourth link 25 which is pivoted at 26 to the upper end of the second link 21 and is also pivoted at 27 to the third link 23, the pivot 27 between the fourth and third links being below the pivot 26 between the fourth and second links. The axes of all the pivots extend horizontally parallel to the back 11 of the box.

The lower end of the second link 21 of each linkage is provided with a roller 28 which, on expansion or contraction of the linkage, runs up or down respectively on the back 11 of the box between the floor 15 and a stop 29 provided on the back 11 at approximately its mid-height. In respect of each linkage, when the linkage is fully contracted, the roller 28 is just clear of the floor 15 and the linkage lies wholly within the box, and when it is fully expanded, the roller 28 is abutting the stop 29.

The stop is provided with an upwardly sloping surface 34 for engagement with the roller 28 and against which said roller may abut. The arrangement is such that during expansion and contraction of the linkage the fourth link 25 moves in a substantially horizontal direction and, when the linkage is fully expanded, the third link 23 is substantially horizontal thereby serving to lock the linkage in its expanded position against undesired movement towards its contracted position. When the linkage is in position between its expanded and contracted positions, however, it tends to move to its contracted position under the effect of its weight and that of the battery.

Since both the first links 20 of the two linkages 17, 18 are fixed to the rod 19 the two linkages will expand and contract together.

Each of the fourth links 25 comprises a bracket portion 30 which, when the linkages 17, 18 are fully contracted transverses the central upright plane of the box parallel to the back thereof. Each bracket portion has a substantially horizontal upwardly facing surface 31 with upward projections 32, 33 at each end thereof and the mid-points of these surfaces lie in the above-mentioned plane when the linkages are fully contracted. The battery is provided on two opposite sides near the upper edges thereof with central lugs which are of a width corresponding to the length of the upwardly facing surfaces 31 of the bracket portions 30 and are adapted to hook over these surfaces 31. The dimensions of the battery are such that when it is thus supported by the linkages 17, 18 the base of the battery is spaced above the floor 15 of the box and the top of the battery is spaced below the top 14 of the box. In this position, the battery also lies close to the back 11 of the box where rubber strips 35 are provided between the battery and the back 11 to absorb any vibrations.

In normal operation of the vehicle the battery is carried by the linkages 17, 18 in their contracted position so that the battery is inside the box. If access to the battery is required, however, for instance for servicing the battery, the battery is pulled out by hand, the linkages 17, 18 guiding the battery so that it moves in a substantially horizontal direction, until the linkages are fully expanded. In this expanded position, the battery is clear of the box and may, if desired, be lifted off the linkages by any convenient form of load-handling apparatus. To return the battery to its contracted position, the battery is easily manhandled to cause the linkages to become unlocked and thereafter the linkages automatically contract slowly to return the battery to its contracted position.

I claim:

1. An electrically-driven vehicle of the type having a compartment for an electric storage battery, wherein an expanding linkage is mounted in the compartment, the linkage being adapted to carry the battery and being so positioned and proportioned that when a battery is mounted on it and it is expanded, it guides the battery in a substantially horizontal direction between a contracted position in which the battery is inside or mainly inside the compartment and an expanded position in which the battery is clear of the compartment, said linkage comprising a first link, which is pivoted to a fixed member in the upper part of the compartment and extends downwardly therefrom, a second link, which is pivoted at a point between its ends to the first link and has its lower end guided for up-and-down movement, a third link pivoted to the first link at a point below the pivot between the first and second links and a fourth link which is pivoted to the second link at a point above the pivot between the first and second links and is also pivoted to the third link, said fourth link being adapted to carry the battery and the arrangement being such that said fourth link moves in a substantially horizontal direction during expansion and contraction of the linkage.

2. A vehicle as claimed in claim 1, wherein the lower end of the second link is provided with a roller which in the expanded position of the linkage abuts against an upper stop on a fixed upright member.

3. A vehicle as claimed in claim 1, wherein the third link is substantially horizontal in the expanded position of the linkage thereby serving to lock the linkage when in its expanded position against undesired movement towards its contracted position.

4. A vehicle as claimed in claim 1, wherein there are two identical expanding linkages one at each side of the compartment, which linkages are connected to move together and are adapted to carry the battery between them.

References Cited by the Examiner

UNITED STATES PATENTS

| | | | |
|---|---|---|---|
| 1,224,324 | 5/1917 | Roberts | 248—277 |
| 1,779,827 | 10/1930 | Reed | 248—277 |
| 2,143,966 | 1/1939 | Yaeger | 248—277 X |
| 2,607,433 | 8/1952 | Simi | 312—27 X |

FOREIGN PATENTS

| | | |
|---|---|---|
| 170,088 | 10/1921 | Great Britain. |

CLAUDE A. LE ROY, *Primary Examiner.*

F. DOMOTOR, *Assistant Examiner.*